Patented June 5, 1945

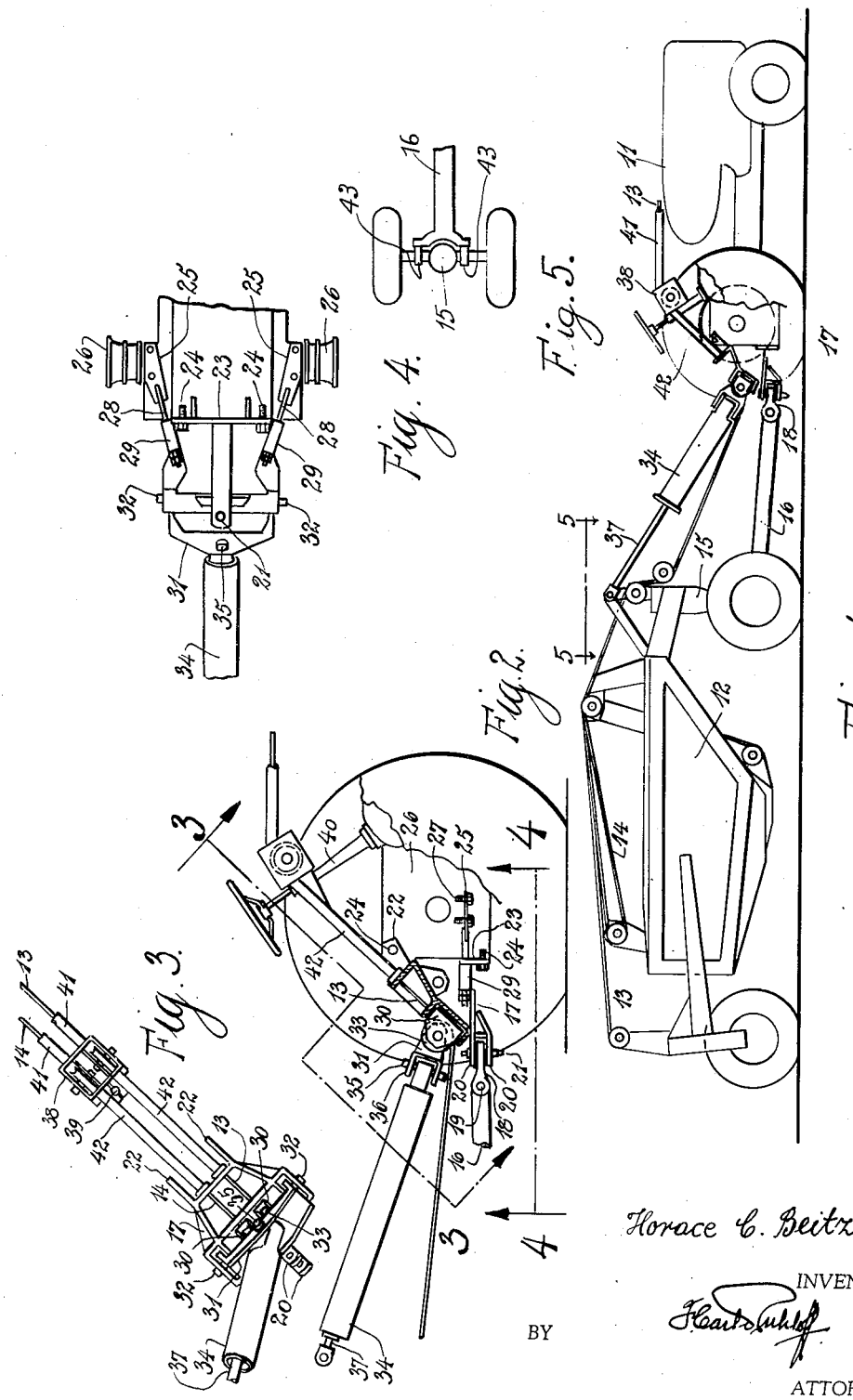

2,377,315

UNITED STATES PATENT OFFICE 2,377,315

HITCH FOR TRAILERS

Horace C. Beitzel, South Milwaukee, Wis., assignor to Bucyrus-Erie Company, South Milwaukee, Wis., a corporation of Delaware Application May 17, 1943, Serial No. 487,260

2 Claims. (Cl. 280—33.2)

My invention relates to new and useful improvements in hitches for trailers.

The advantages of hitches of the general type contemplated herein are well set forth in the copending application of Lovel R. Simmons, Serial No. 413,550, filed October 3, 1941, for improvements in Hauling units. The present invention is an improvement over the species shown in Figure 6 of that application.

The principal object of the present invention is to eliminate any too great tendency of uptipping of the front end of the tractor when part or all of the weight of the front end of the trailer is transferred to the rear end of the tractor.

A further object is to design a trailer hitch particularly suited to be employed when the trailer is a scraper of the general type shown and described in U. S. Reissue Patent No. 21,947, issued November 18, 1941, to Earl B. Maloon. The attainment of this second object necessitates making provision for the passage of control ropes through the hitch from a winch on the tractor to the parts on the trailer-scraper to be controlled thereby.

In addition to my principal objects, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawing, which are hereinafter particularly described and explained.

Throughout the description, the same reference number is applied to the same member or to similar members.

Figure 1 is a side elevation, partly in section, of a tractor and a scraper, connected together by a hitch according to my invention.

Figure 2 is an enlarged portion of Figure 1, showing the hitch-bracket and associated parts.

Figure 3 is a diagonal view of the hitch-bracket and associated parts, taken along the lines 3—3 of Figure 2.

Figure 4 is a plan view of the hitch-bracket and associated parts, from beneath.

Figure 5 is a plan view of the attachment between the drawbar and the trailer, taken along the lines 5—5 of Figure 1.

Referring now to Figure 1, we see that 11 is a tractor, and 12 is a trailer.

From a two-drum winch (not shown) located at the front of the tractor, and controlled from the driver's seat, there extend two ropes, 13 and 14. The complete reeving of these ropes is not shown, it being unessential to my present invention. Suffice it to say that rope 13 controls the digging depth, lowering and raising the digging edge, into and out of contact with the ground; and that rope 14 is employed first to open the front closure of the carrying bowl, and then to tilt that bowl for dumping out the contents thereof.

Turning now more particularly to Figures 2, 3 and 4, we see that the front truck 15 of scraper 12, which truck is capable of turning about a vertical axis with respect to the rest of the scraper, has its draw-bar 16 connected to a bracket 17 of the tractor by means of a universal joint, which will now be described, although no invention resides in the particular form of the universal joint employed. The drawbar 16 is attached to the front truck 15 of the scraper at 43, 43, so as to pivot vertically, but not horizontally, with respect to the front truck.

The particular universal joint shown in Figures 2 and 3 consists of a V-bolt 18 pivoted on the front end of draw-bar 16, by means of a horizontal transverse pin 19, and pivoted between two vertically spaced lugs 20 (forming a part of bracket 17), by means of vertical pin 21.

The bracket 17 itself may be secured to the rear end of the tractor 11 in any convenient manner, depending on the type and make of tractor. In the particular form of the device shown, two plates 22, integral with the bracket, overlap the sides of the rear end of the tractor, and plate 23, integral with the bracket, rests against the face of the rear end of the tractor. These plates are secured to the tractor by bolts 24. Plates 25 are secured to the rear axle housings 26 of the tractor, by bolts 27, and to the bracket 17 by bolts 28, passing through hollow sleeves 29, integral with the bracket.

Above the two lugs 20, the bracket 17 carries two sheave-housings 30, each pivoted to the bracket by an offset pivot. Overlaying these two housings is a yoke 31, pivoted to the bracket 17 at 32, at right angles to the pivots of the housings. The pivot 32 is approximately in line with the axles of the two sheaves 33 which are mounted in the respective housings.

A hydraulic cylinder 34 has its base end pivoted by pin 35 between two jaws 36 of yoke 31. Thus the yoke 31 and associated parts constitute a universal connection between the cylinder and the bracket.

The piston-rod 37 of the cylinder 34 is pivotally attached to some high point on the front truck 15 of the trailer-scraper 12.

The hydraulic pipes leading to the piston, the hydraulic pump actuated by the engine of the tractor, and the valves whereby the operator controls the admission of fluid to the cylinder and its exhaustion therefrom, are none of them shown, being conventional and well-known, and constituting no part of my invention.

To lead the ropes 13 and 14 from the front of the tractor to the sheaves 33 on the bracket, there is preferably a stationary double-sheave housing 38, clamped (as at 39) to the steering post 40 of the tractor. From this stationary housing, two guide-pipes 41 lead forward, and two more guide-pipes 42 lead to the bracket.

Each of the two ropes 13 and 14 is threaded through one of pipes 41, thence over one of the sheaves in housing 38, thence through one of pipes 42, thence under one of the swiveled sheaves 33, and thence to the scraper.

It will be seen that the above-described arrangement leads the control ropes from the tractor to the scraper without their interfering with the cylinder or drawbar, even when the tractor is passing over uneven ground and/or turning.

The directions and points of application of the forces is important.

Even if the draw-bar has a substantial slope, the static resultant of the two forces will be exactly vertically downward, for if it had any horizontal component, the tractor would be moved thereby. This resultant force will be applied to the tractor at the point of intersection of the two lines of force.

Accordingly if this point, as in comparable prior constructions, is well to the rear of the rear axle of the tractor, a considerable upsetting moment will result, tending to lift the front wheels of the tractor off the ground, and thus greatly reducing their steering traction.

Whereas if this point, as in Figure 1 hereof, is almost directly under the rear axle, no such upsetting moment will result.

Of course, when the tractor is pulling the trailer, the normal draw-bar pull, which would exist entirely apart from the existence of the apparatus of my invention, would tend to lift the front of the tractor. But it is assumed that the tractor will be properly balanced for this, and accordingly my invention need take care merely of the added tipping movement due to the transfer of weight from the trailer to the tractor.

Having now described and illustrated one form of my invention, I wish it to be understood that my invention is not to be limited to the specific form or arrangement of parts herein described and shown, except insofar as required by limitations in my claims.

I claim:

1. In a drawbar bracket for a tractor, the combination of: the bracket proper; means for attachment of the drawbar to the bracket; a rearwardly projecting yoke, pivoted on the bracket above said means, with widely spread feet, and having on its rearwardly projecting center a pivotal attachment for a cylinder-piston assembly; at least one sheave-housing pivoted on the bracket, on an axis forwardly offset from and at right angles to the axis of the sheave; a sheave journaled in said housing; and means for attaching the bracket to the rear portion of a tractor; the sheave-housing being located between the feet of the yoke, so that the axis of the yoke is substantially in line with the axis of the sheave, when the sheave is in its mean position.

2. In a tractor-trailer hitch, the combination of: a bracket; means for attaching this bracket to the rear portion of a tractor; a drawbar; means for attaching the drawbar to a trailer; a cylinder-piston assembly, capable of being forcibly expanded; means for attaching this assembly to the trailer a substantial distance above the point of attachment of the drawbar; means for attachment of the drawbar directly to the bracket; a rearwardly projecting yoke, pivoted on the bracket above said means, with widely spread feet, and having on its rearwardly projecting center a pivotal attachment for the cylinder-piston assembly; at least one sheave-housing pivoted on the bracket, on an axis forwardly offset from and at right angles to the axis of the sheave; a sheave journaled in said housing; the sheave-housing being located between the feet of the yoke, so that the axis of the yoke is substantially in line with the axis of the sheave, when the sheave is in its mean position; the drawbar and the assembly being so positioned and oriented that the line of action of the assembly and the line of action of the drawbar will intersect approximately under the rear axle of the tractor.

HORACE C. BEITZEL.